United States Patent
Tokutomi et al.

(10) Patent No.: US 7,688,386 B2
(45) Date of Patent: Mar. 30, 2010

(54) DE-INTERLACING APPARATUS, DE-INTERLACING METHOD, AND VIDEO DISPLAY APPARATUS

(75) Inventors: Hideaki Tokutomi, Kanagawa (JP); Himio Yamauchi, Kanagawa (JP); Shogo Matsubara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/264,817

(22) Filed: Nov. 4, 2008

(65) Prior Publication Data

US 2009/0167937 A1  Jul. 2, 2009

(30) Foreign Application Priority Data

Dec. 26, 2007  (JP)  ............................. 2007-335006

(51) Int. Cl.
*H04N 7/01* (2006.01)
*H04N 11/20* (2006.01)
*H04N 5/21* (2006.01)

(52) U.S. Cl. ...................... 348/452; 348/448; 348/451; 348/459; 348/699; 348/701

(58) Field of Classification Search ................ 348/448, 348/452, 451, 459, 699, 700, 701, 620, 431.1; 382/236, 300; 375/240.16, 240.27
See application file for complete search history.

(56) References Cited

U.S. PATENT DOCUMENTS

| | | | |
|---|---|---|---|
| 7,362,379 B2 * | 4/2008 | Michel et al. | 348/452 |
| 7,440,032 B2 * | 10/2008 | Salzer et al. | 348/452 |
| 2007/0040942 A1 * | 2/2007 | Yamauchi | 348/558 |
| 2007/0046811 A1 * | 3/2007 | Kimura et al. | 348/448 |
| 2007/0279532 A1 * | 12/2007 | Yamauchi | 348/701 |

FOREIGN PATENT DOCUMENTS

| | | |
|---|---|---|
| JP | 01-108886 A | 4/1989 |
| JP | 4-320180 | 11/1992 |
| JP | 5-68239 | 3/1993 |
| JP | 8-111852 | 4/1996 |

(Continued)

OTHER PUBLICATIONS

Japanese Patent Application No. 2007-335006 Decision of a Patent Grant, mailed May 26, 2009, (English translation).

*Primary Examiner*—David L Ometz
*Assistant Examiner*—Jean W Désir
(74) *Attorney, Agent, or Firm*—Blakely Sokoloff Taylor & Zafman

(57) ABSTRACT

According to one embodiment, a de-interlacing apparatus includes: a motion vector detecting section; a full-screen shift detecting section detecting a full-screen shift; a moving-or-still judging section performing a moving/still judgment for a video signal; a moving judgment correcting section correcting a moving/still judgment result to lean toward a moving judgment when full-screen shift is detected; a first interpolation signal generating section generating a first interpolation signal for interpolating a one-field delay signal based on the motion vector and the full-screen shift; a second interpolation signal generating section generating a second interpolation signal for interpolating the one-field delay signal from a current field signal or a two-field delay signal; and an interpolation signal mixing section mixing the first and second interpolation signals to generate a mixed interpolation signal.

9 Claims, 6 Drawing Sheets

FOREIGN PATENT DOCUMENTS

| | | |
|---|---|---|
| JP | 10-112845 | 4/1998 |
| JP | 2001-339694 A | 12/2001 |
| JP | 2003-111080 A | 4/2003 |
| JP | 2003-274371 A | 9/2003 |
| JP | 2003-339027 | 11/2003 |
| JP | 2004-312680 A | 11/2004 |
| JP | 2006-174123 A | 6/2006 |
| JP | 2007-259314 A | 10/2007 |

* cited by examiner

DE-INTERLACING APPARATUS, DE-INTERLACING METHOD, AND VIDEO DISPLAY APPARATUS

CROSS-REFERENCE TO RELATED APPLICATIONS

This application is based upon and claims the benefit of priority from Japanese Patent Application No. 2007-335006, filed Dec. 26, 2007, the entire contents of which are incorporated herein by reference.

BACKGROUND

1. Field

One embodiment of the invention relates to a de-interlacing apparatus that converts an interlaced scanning video signal to a deinterlaced signal, a de-interlacing method, and a video display apparatus with the de-interlacing apparatus.

2. Description of the Related Art

A conventional de-interlacing apparatus that converts an interlaced scanning video signal to a deinterlaced video signal detects a motion of an image and generates an interpolation signal to interpolate scan lines based on the detection result in order to prevent an image quality degradation in a motion area.

Motion adaptive processing is used to interpolate scan lines. In the motion adaptive processing, to adapt to a motion of an image, an interpolation signal (an intrafield interpolation signal) is generated from scan lines adjacent longitudinally when an image is moving. When an image is static, an interpolation signal is generated from scan lines at the same position of a prior field and a subsequent field.

A technique of interpolating scan lines applying detection of a motion vector has been known. In this method, a motion vector of an image is detected, and depending on the value, a video signal of one field prior is shifted, and then an interpolation signal (a vector interpolation signal) is generated. A scanning line interpolation apparatus disclosed in, for example, Japanese Patent Application Publication (KOKAI) No. 2003-339027 has been known regarding techniques to generate an interpolation signal in de-interlacing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
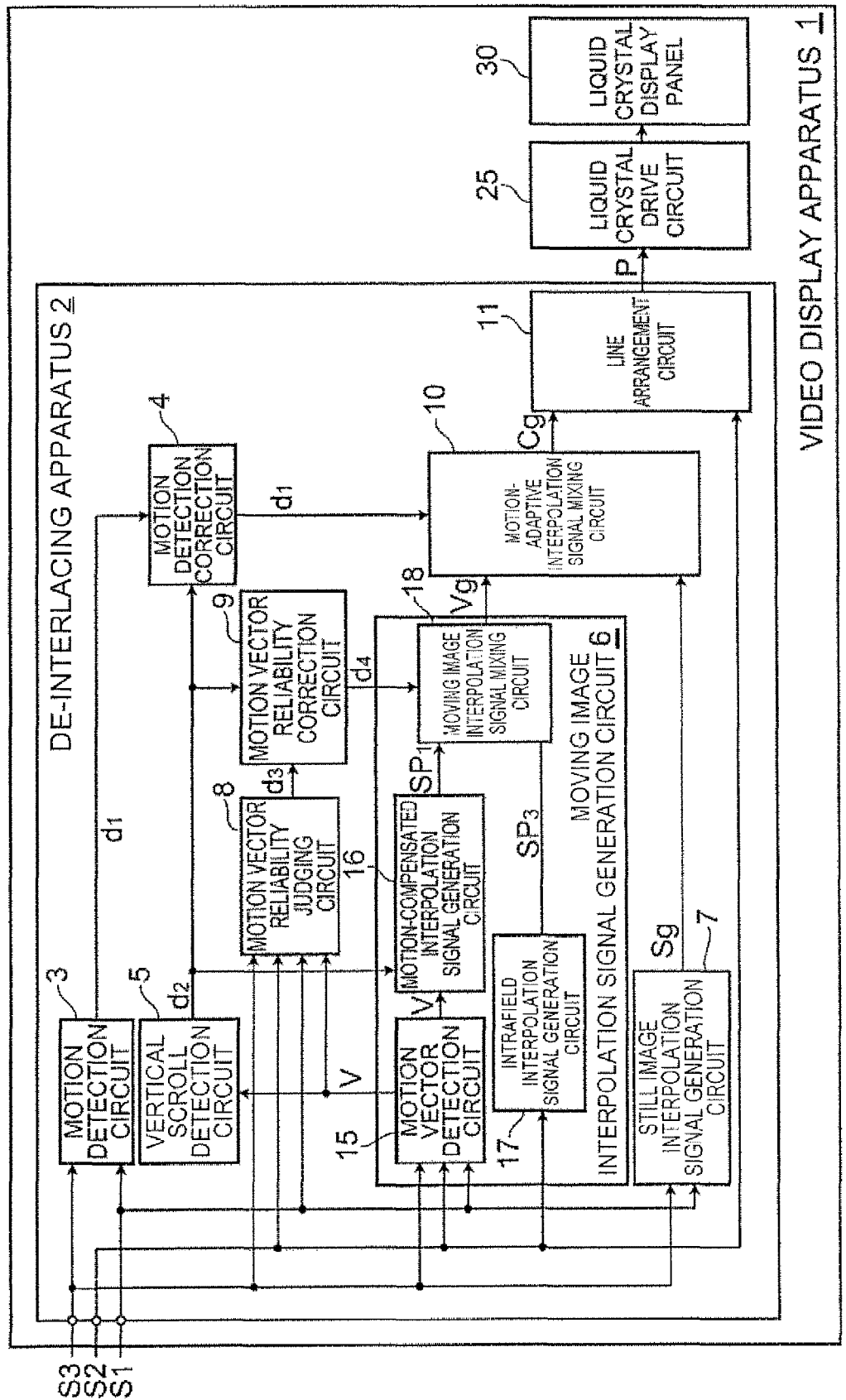
FIG. 1 is an exemplary block diagram of a configuration of a video display apparatus provided with a de-interlacing apparatus according to an embodiment of the invention.

Various embodiments according to the invention will be described hereinafter with reference to the accompanying drawings. In general, according to one embodiment of the invention, a de-interlacing apparatus includes: a motion vector detecting section that detects a motion vector of an input video signal; a full-screen shift detecting section that detects a full-screen shift indicating a shift of a whole screen in a predetermined direction from the motion vector detected by the motion vector detecting section; a moving-or-still judging section that performs a moving-or-still judgment according to an amount of motion of the input video signal based on a difference value between a current field signal of the input video signal and a two-field delay signal obtained by delaying the current field signal by two fields; a moving judgment correcting section that corrects, when a full-screen shift is detected by the full-screen shift detecting section, a judgment result obtained by the moving-or-still judging section to lean toward a moving judgment; a first interpolation signal generating section that performs motion compensation for a one-field delay signal, which is obtained by delaying the current field signal by one field, using detection results obtained by the motion vector detecting section and the full-screen shift detecting section, and generates a first interpolation signal for interpolating the one-field delay signal; a second interpolation signal generating section that generates a second interpolation signal for interpolating the one-field delay signal from any one of the current field signal and the two-field delay signal; and an interpolation signal mixing section that mixes the first interpolation signal and the second interpolation signal depending on the judgment result obtained by the moving-or-still judging section and corrected by the moving judgment correcting section to generate a mixed interpolation signal.

According to another embodiment of the invention, a de-interlacing method includes: detecting a motion vector of an input video signal; detecting a full-screen shift indicating a shift of a whole screen in a predetermined direction from the motion vector detected; performing a moving-or-still judgment according to an amount of motion of the input video signal based on a difference value between a current field signal of the input video signal and the two-field delay signal obtained by delaying the current field signal by two fields; correcting, when a full-screen shift is detected, a judgment result obtained by the moving-or-still judgment to lean toward a moving judgment; performing motion compensation for a one-field delay signal, which is obtained by delaying the current field signal by one field, using detection results obtained by the detecting a motion vector and the detecting a full-screen shift, and generating a first interpolation signal for interpolating the one-field delay signal; generating a second interpolation signal for interpolating the one-field delay signal from any one of the current field signal and the two-field delay signal; and generating a mixed interpolation signal by mixing the first interpolation signal and the second interpolation signal depending on the judgment result obtained by the moving-or-still judgment and corrected by the correcting.

According to still another embodiment of the invention, a video display apparatus includes: a de-interlacing section that outputs a deinterlaced signal; and a video display section that displays a video image using the deinterlaced signal output from the de-interlacing section. The de-interlacing section includes a motion vector detecting section that detects a motion vector of an input video signal; a full-screen shift detecting section that detects a full-screen shift indicating a shift of a whole screen in a predetermined direction from the motion vector detected by the motion vector detecting section; a moving-or-still judging section that performs a moving-or-still judgment according to an amount of motion of the input video signal based on a difference value between a current field signal of the input video signal and a two-field delay signal obtained by delaying the current field signal by two fields; a moving judgment correcting section that corrects, when a full-screen shift is detected by the full-screen shift detecting section, a judgment result obtained by the moving-or-still judging section to lean toward a moving judgment; a first interpolation signal generating section that performs motion compensation for a one-field delay signal, which is obtained by delaying the current field signal by one field, using detection results obtained by the motion vector detecting section and the full-screen shift detecting section, and generates a first interpolation signal for interpolating the one-field delay signal; a second interpolation signal generating section that generates a second interpolation signal for interpolating the one-field delay signal from any one of the current field signal and the two-field delay signal; and an interpolation signal mixing section that mixes the first interpolation signal and the second interpolation signal depending on the judgment result obtained by the moving-or-still judging section and corrected by the moving judgment correcting section to generate a mixed interpolation signal.

FIG. 1 is a block diagram of a configuration of a video display apparatus 1 provided with a de-interlacing apparatus 2 according to an embodiment of the present invention. As illustrated in FIG. 1, the video display apparatus 1 has the de-interlacing apparatus 2, a liquid crystal drive circuit 25 and a liquid crystal display panel 30. The video display apparatus 1 has functions of outputting a deinterlaced signal P through the de-interlacing apparatus 2 and displaying a video image on the liquid crystal display panel 30 using the deinterlaced signal P. The liquid crystal drive circuit 25 generates a video signal that is necessary to display a video image on the liquid crystal display panel 30 using the deinterlaced signal P. The liquid crystal display panel 30 displays a video image based on the video signal.

A current field signal S1 being an input interlaced scanning video signal, a one-field delay signal S2 that is delayed from the current field signal S1 by one field and a two-field delay signal S3 that is further delayed from the one-field delay signal S2 by one field are input to the de-interlacing apparatus 2.

The de-interlacing apparatus 2 has a motion detection circuit 3, a motion detection correction circuit 4, a vertical scroll detection circuit 5, a moving image interpolation signal generation circuit 6, a still image interpolation signal generation circuit 7, a motion vector reliability judging circuit 8, a motion vector reliability correction circuit 9, a motion-adaptive interpolation signal mixing circuit 10, and a line arrangement circuit 11.

The motion detection circuit 3 has a function of a moving-or-still judging section. The motion detection circuit 3 obtains a difference value between the current field signal S1 and the two-field delay signal S3, and makes a moving-or-still judgment, i.e., judges whether the current point is in a motion area or a static area, according to the amount of the motion of an input video signal based on the obtained difference value and then outputs moving-or-still judgment data d1 indicating the judgment result.

The motion detection correction circuit 4 has a function as a moving judgment correcting section that corrects the moving-or-still judgment data d1 to lean toward the judgment that the current point is in a motion area (moving judgment) when vertical scrolling as descried later is detected in the vertical scroll detection circuit 5 and a scroll detection signal d2 described later is output from the vertical scroll detection circuit 5. To correct the moving-or-still judgment data d1 to lean to the moving judgment means emphasizing the presence of motion by increasing a value of the moving-or-still judgment data d1 indicating the presence of motion and the like.

The vertical scroll detection circuit 5 detects a shift of a whole screen in the vertical direction (also referred to as "vertical scrolling") with respect to an input video signal, and outputs the scroll detection signal d2 when such a shift is detected. When the vertical scroll detection circuit 5 detects that the whole screen shifts in the vertical direction based on a motion vector V detected in a motion vector detection circuit 15 described later, it outputs the scroll detection signal d2. The vertical scroll detection circuit 5 is described herein as being configured to detect vertical scrolling; however, it can be configured to detect that the whole screen shifts in a predetermined direction such as the horizontal direction or the oblique direction (full-screen shift). The vertical scroll detection circuit 5 has a function as a full-screen shift detecting section.

The moving image interpolation signal generation circuit 6 generates a moving image interpolation signal Vg. A configuration of the moving image interpolation signal generation circuit 6 will be described later.

The still image interpolation signal generation circuit 7 has a function as a second interpolation signal generating section that generates a still image interpolation signal Sg (a second interpolation signal) interpolated to the one-field delay signal S2 from either the current field signal S1 or the two-field delay signal S3. The still image interpolation signal generation circuit 7 receives the current field signal S1 and the two-field delay signal S3 and generates the still image interpolation signal Sg using scan lines of the respective signals at the same position. The still image interpolation signal generation circuit 7 can use a direct line of the current field signal S1 or the two-field delay signal S3 when an image is a still image.

The motion vector reliability judging circuit S has a function as a reliability judging section judging the reliability of the motion vector V. The motion vector reliability judging circuit 8 obtains a correlation between pixels or pixel blocks to be judged along the motion vector V direction and then judges the motion vector reliability based on the obtained correlation. The motion vector reliability judging circuit 8 outputs reliability data d3 indicating the reliability of the motion vector V to the motion vector reliability correction circuit 9. When the correlation is high, the reliability is high, and as the correlation becomes lower, the reliability is judged lower.

The motion vector reliability correction circuit 9 outputs corrected reliability data d4 after correcting the reliability data d3 so that the reliability of the motion vector V becomes high when vertical scrolling is detected in the vertical scroll detection circuit 5 and the scroll detection signal d2 is output.

The motion-adaptive interpolation signal mixing circuit 10 has a function as an interpolation signal mixing section. The motion-adaptive interpolation signal mixing circuit 10 mixes the moving image interpolation signal Vg and the still image interpolation signal Sg depending on the moving-or-still judgment data d1 corrected in the motion detection correction circuit 4, and then outputs a mixed interpolation signal Cg.

The line arrangement circuit 11 generates the deinterlaced signal P using the mixed interpolation signal Cg mixed in the motion-adaptive interpolation signal mixing circuit 10 and the one-field delay signal S2 as the direct signal, and outputs the generated deinterlaced signal P to the liquid crystal drive circuit 25.

The moving image interpolation signal generation circuit 6 has the motion vector detection circuit 15, a motion-compensated interpolation signal generation circuit 16, an intrafield interpolation signal generation circuit 17, and a moving image interpolation signal mixing circuit 18.

The motion vector detection circuit 15 detects the motion vector V using the current field signal S1, the one-field delay signal S2 and the two-field delay signal S3, and outputs the detected motion vector V to the vertical scroll detection circuit 5, the motion vector reliability judging circuit 8, and the motion-compensated interpolation signal generation circuit 16.

The motion-compensated interpolation signal generation circuit 16 being a first interpolation signal generating section generates a motion-compensated interpolation signal SP1. The motion-compensated interpolation signal generation circuit 16 generates the motion-compensated interpolation signal (the first interpolation signal) SP1 corresponding to between lines of the one-field delay signal S2 depending on the motion vector V detected by the current field signal S1 and the two-field delay signal S3 in the motion vector detection circuit 15. In this case, when the scroll detection signal d2 is output from the vertical scroll detection circuit 5, vertical scrolling is detected. Therefore, the motion-compensated interpolation signal generation circuit 16 deals with all the motion vectors V as the same motion vectors, and generates the motion-compensated interpolation signal SP1.

The intrafield interpolation signal generation circuit 17 being a third interpolation signal generating section generates an intrafield interpolation signal (a third interpolation signal) SP3 interpolated by the one-field delay signal S2 by way of intrafield interpolation. In this case, the intrafield interpolation signal generation circuit 17 generates the intrafield interpolation signal SP3 from longitudinally adjacent scan lines.

The moving image interpolation signal mixing circuit 18 being a moving image interpolation signal mixing section mixes the motion-compensated interpolation signal SP1 and the intrafield interpolation signal SP3 depending on the corrected reliability data d4 corrected in the motion vector reliability correction circuit 9, and generates the moving image interpolation signal Vg and then outputs it.

A characteristic operation of the de-interlacing apparatus 2 is explained. When the current field signal S1, the one-field delay signal S2 and the two-field delay signal S3 are input to the de-interlacing apparatus 2, the motion detection circuit 3 makes moving-or-still judgment, and outputs the moving-or-still judgment data d1.

When the vertical scroll detection circuit 5 detects vertical scrolling from the motion vector V, it outputs the scroll detection signal d2.

Here suppose that, for example, an input video signal represents a video image that shifts in a predetermined direction on the whole screen like the credits of a movie. Since such a video image shifts vertically upward on the whole screen, it is likely that motion of the image is highly directive. Accordingly, when an video signal having such a characteristic is input, the vertical scroll detection circuit 5 outputs the scroll detection signal d2.

When the vertical scroll detection circuit 5 outputs the scroll detection signal d2, the motion detection correction circuit 4 corrects the moving-or-still judgment data d1 to lean to the moving judgment. Besides, the motion vector reliability correction circuit 9 corrects the reliability data d3 to lean to the motion-compensated interpolation signal SP1.

Accordingly, in the de-interlacing apparatus 2, when an input video signal represents an image that shifts in a predetermined direction on the whole screen, the motion-adaptive interpolation signal mixing circuit 10 can generate the mixed interpolation signal Cg a high mixing ratio of the moving image interpolation signal Vg, which makes it possible to generate the highly accurate mixed interpolation signal Cg which reflects the characteristic of the input video signal that the whole screen shifts in the vertical direction. Namely, since the motion-compensated interpolation signal SP1 makes it easier to mix in the mixed interpolation signal Cg eventually, the mixing ratio of the interpolation signal SP1 is increased. Thus, the mixed interpolation signal Cg of the case when the whole screen shifts in a predetermined direction can be more appropriate, which enables the image quality to improve.

Figure 2A:
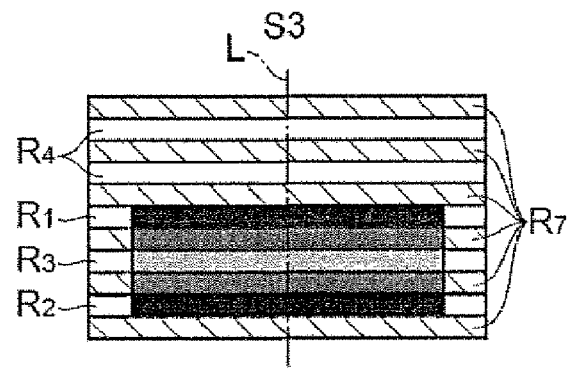
FIGS. 2A, 2B, and 2C are exemplary views of signals (a two-field delay signal, a one-field delay signal, and a current field signal) after interpolation signals are interpolated when vertical scrolling is performed in the embodiment.
Figure 2B:
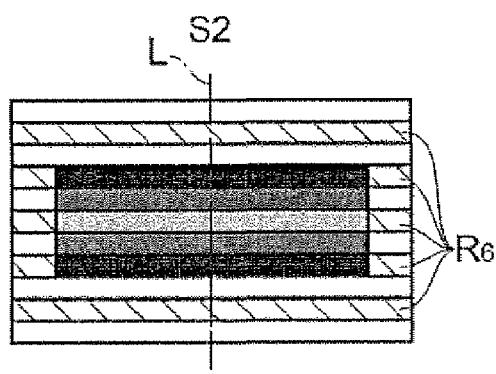
Figure 2C:
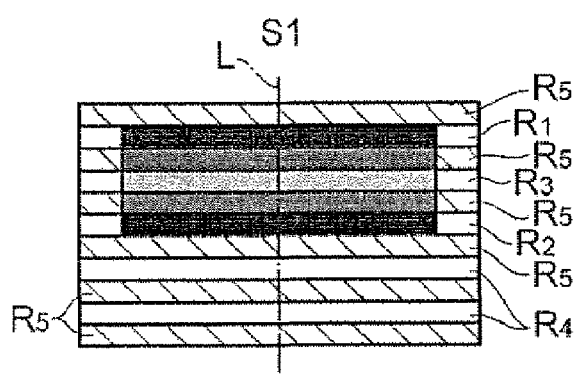

A content of the deinterlaced signal P is explained referring to FIGS. 2A, 2B, and 2C to FIG. 6. FIGS. 2A, 2B, and 2C are schematic views of the current field signal S1, the one-field delay signal S2, and the two-field delay signal S3 after the interpolation signal is interpolated when vertical scrolling is performed. FIG. 2A depicts the two-field delay signal S3, FIG. 2B depicts the one-field delay signal S2, and FIG. 2C depicts the current field signal S1. In FIGS. 2A, 2B, and 2C, horizontal lines (R1 to R7) indicate video signals, shaded lines R5, R6, and R7 indicate lines (interpolation lines) interpolated by interpolation signals, and lines R1 to R4 except those indicate direct lines.

FIGS. 2A, 2B, and 2C illustrate a state that an image formed of the two black lines R1 and R2 with the gray line R3 between them shifts vertically upward. FIG. 2C indicates the current field signal S1, FIG. 2B indicates the one-field delay signal S2, and FIG. 2A indicates the two-field delay signal S3.

Figure 3:
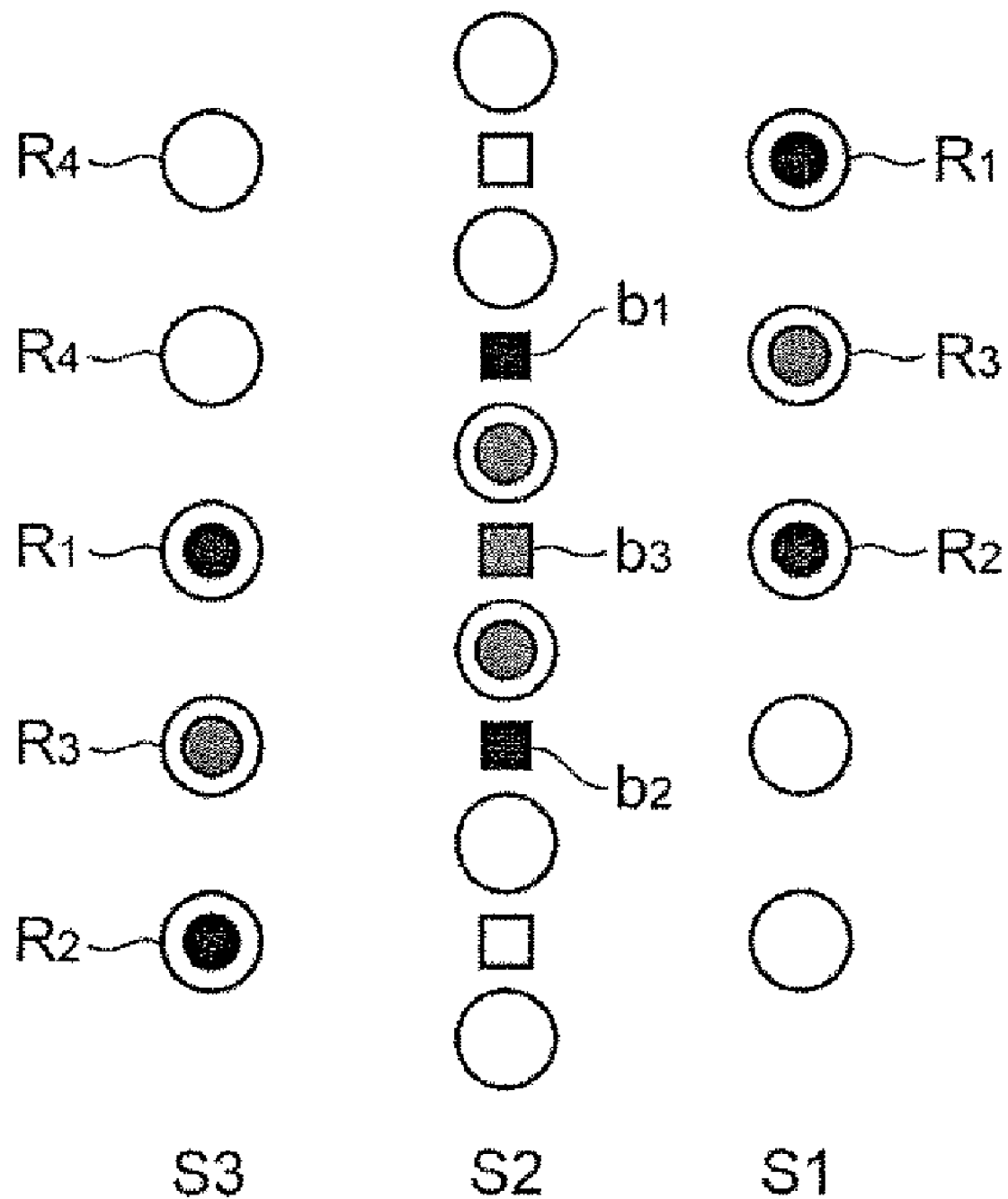
FIG. 3 is an exemplary view of the two-field delay signal, the one-field delay signal, and the current field signal when ideal de-interlacing is performed in the embodiment.
Figure 4:
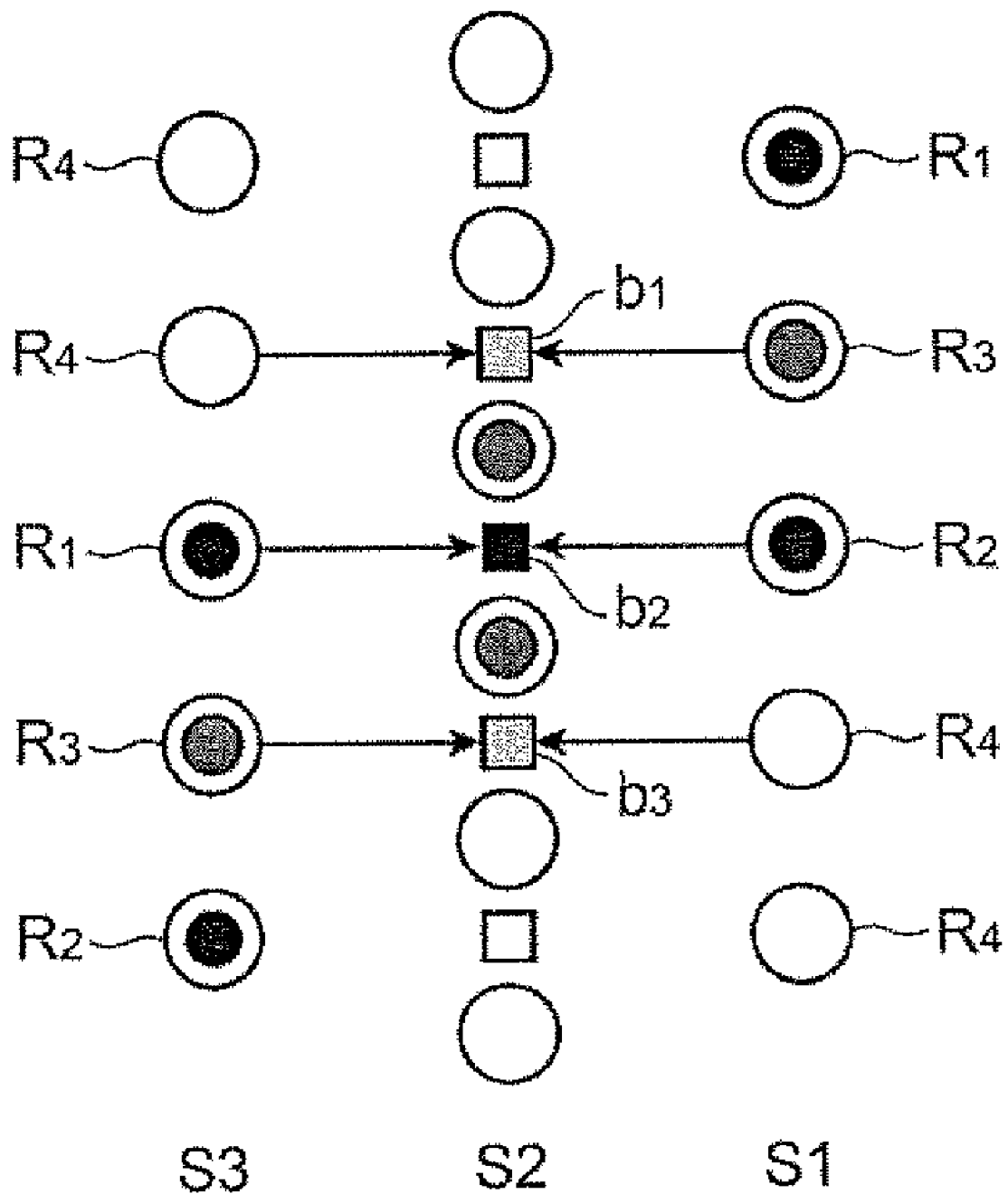
FIG. 4 is an exemplary view of the two-field delay signal, the one-field delay signal, and the current field signal when an interpolation signal is interpolated by a still image interpolation signal generation circuit in the embodiment.
Figure 5:
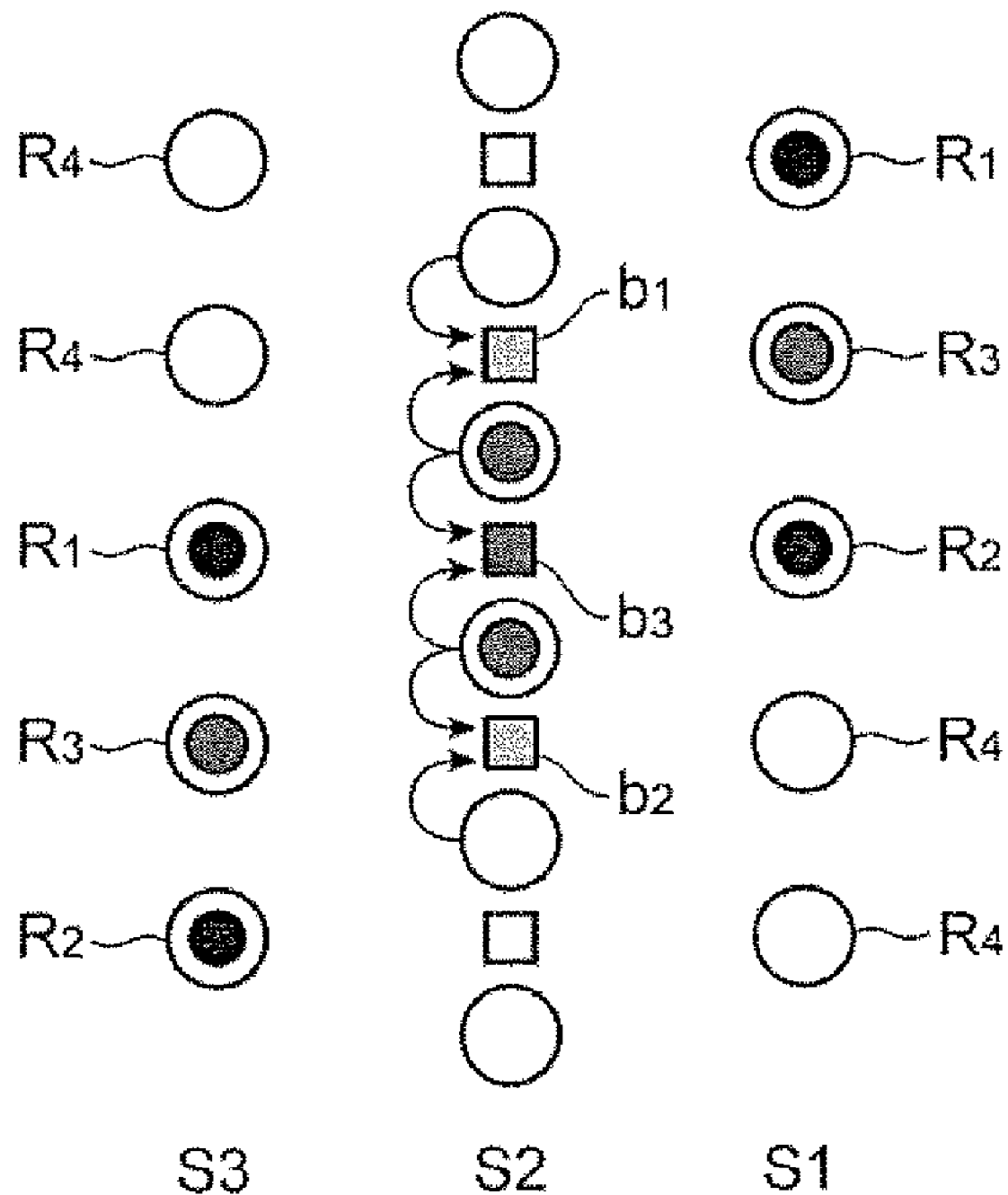
FIG. 5 is an exemplary view of the two-field delay signal, the one-field delay signal, and the current field signal when an interpolation signal is interpolated by an intrafield interpolation signal generation circuit in the embodiment.
Figure 6:
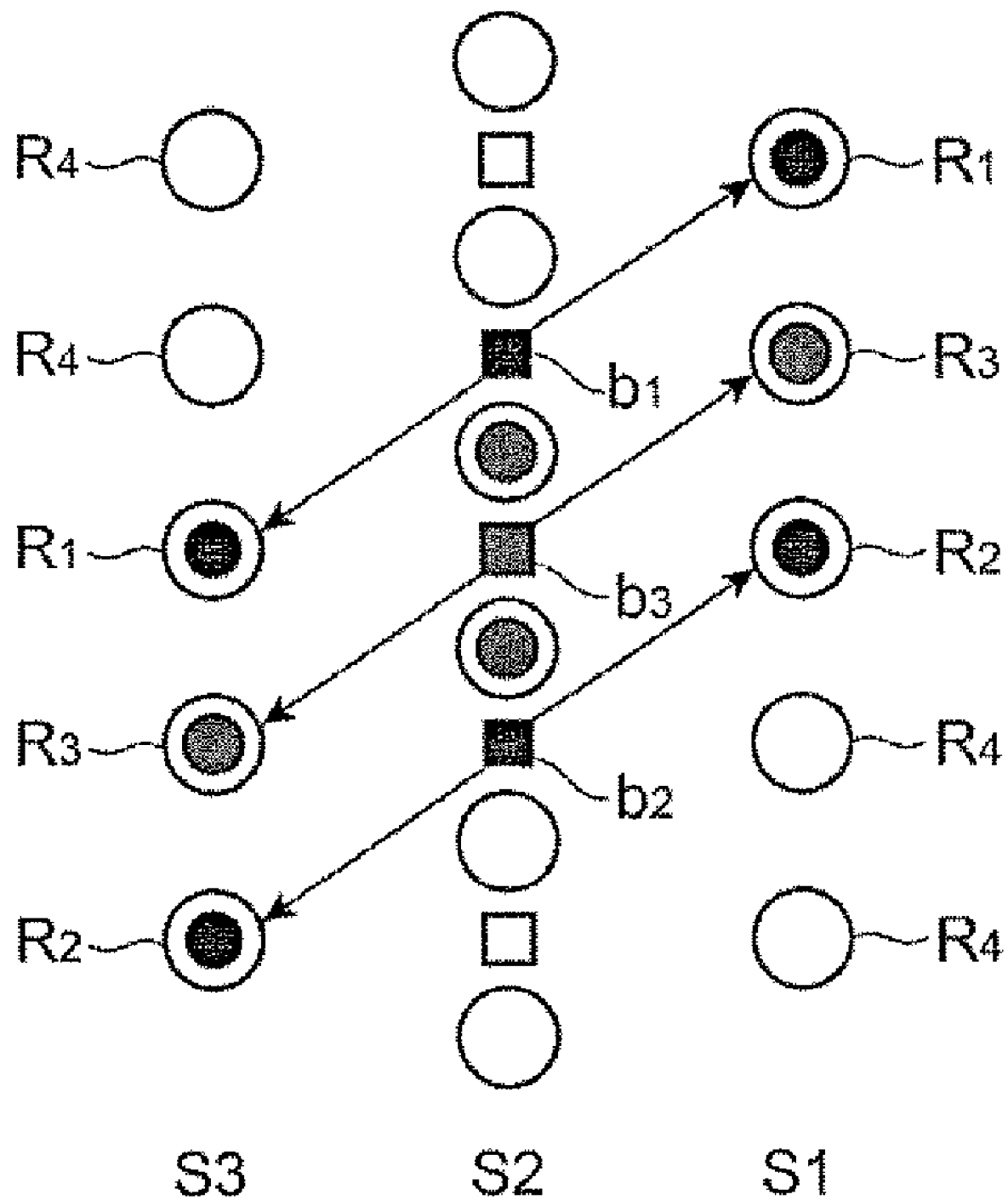
FIG. 6 is an exemplary view of the two-field delay signal, the one-field delay signal, and the current field signal when an interpolation signal is interpolated by a motion-compensated interpolation signal generation circuit in the embodiment.

FIG. 3 to FIG. 6 depict pixels positioned on a vertical line L of the video signals illustrated in FIGS. 2A, 2B, and 2C. FIG. 3 illustrates the case when ideal de-interlacing is performed, and FIG. 4 illustrates the case when the still image interpolation signal Sg is interpolated by the still image interpolation signal generation circuit 7. FIG. 5 illustrates the case when the intrafield interpolation signal SP3 is interpolated by the intrafield interpolation signal generation circuit 17, and FIG. 6 illustrates the case when the interpolation signal SP1 is interpolated by the motion-compensated interpolation signal generation circuit 16.

In FIG. 3 to FIG. 6, pixels of direct signals (the current field signal S1, the one-field delay signal S2, and the two-field delay signal S3) are indicated by round marks, and are depicted in the same color (anyone of black, gray, and white) as in FIGS. 2A, 2B, and 2C. Further, in FIG. 3 to FIG. 6, interpolation pixels are indicated by square marks only for the one-field delay signal S2, and interpolation pixels for the current field signal S1 and the two-field delay signal S3 are omitted.

Since the video image formed of the lines R1 to R3 shifts vertically upward in FIGS. 2A, 2B, and 2C, it is desirable that an interpolation signal which reflects the motion of the image is interpolated. Namely, as illustrated in FIG. 3, it is ideal that an interpolation pixel b1 is generated in the same color as that of the line R1 of the current field signal S1 and the two-field delay signal S3, an interpolation pixel b2 is generated in the same color as that of the line R2, and further, an interpolation pixel b3 is generated in the same color as that of the line R3. With this one-field delay signal S2, an image is displayed clearly in the process of a shift from the two-field delay signal S3 to the current field signal S1.

On the other hand, when the still image interpolation signal Sg is interpolated by the still image interpolation signal generation circuit 7, the interpolation pixels b1, b2, and b3 are generated based on an average of the current field signal S1 and the two-field delay signal S3. Accordingly, as illustrated in FIG. 4, the interpolation pixel b2 becomes black; however, both the interpolation pixels b1 and b3 become light gray.

The intrafield interpolation signal SP3 is generated by way of intrafield interpolation in the intrafield interpolation signal generation circuit 17 The intrafield interpolation signal SP3 is generated based on an average of adjacent lines (may be an average of two adjacent longitudinal lines) of the one-field delay signal S2, and therefore, as illustrated in FIG. 5, the interpolation pixel b3 becomes gray, and both the interpolation pixels b1 and b2 become light gray.

FIG. 6 illustrates the case that the interpolation signal SP1 is interpolated by the motion-compensated interpolation signal generation circuit 16. When the reliability of the motion vector is high, it is possible to use the pixel of the direct line by way of motion compensation from the current field signal S1 and the two-field delay signal S3. Therefore, as illustrated in FIG. 6, the interpolation pixels b1 and b2 are generated in the same black color as pixels of the lines R1 and R2, respectively, and the interpolation pixel b3 is generated in the same gray color as pixels of the line R3. Accordingly, since the interpolation pixels b1, b2, and b3 are generated in the same colors as in FIG. 3, an ideal interpolation signal can be generated, which makes it possible to generate a higher accurate interpolation signal compared to the cases of FIG. 4 and FIG. 5.

Like this, when the reliability of the motion vector V is high, it is favorable that the moving image interpolation signal mixing circuit 18 increases the ratio of the motion-compensated interpolation signal SP1 to higher than the intrafield interpolation signal SP3 to mix the both. This makes the moving image interpolation signal Vg substantially reflect the motion-compensated interpolation signal SP1. Thus, as descried above, it is possible to improve the image quality in the case of full-screen shift.

When vertical scrolling is detected it is likely that the reliability of the motion vector V is high since the whole screen shifts in the vertical direction. In the de-interlacing apparatus 2, when the scroll detection signal d2 is output, the motion vector reliability correction circuit 9 outputs the corrected reliability data d4 with increased reliability. On receipt of the corrected reliability data d4, the moving image interpolation signal mixing circuit 18 generates the moving image mixed interpolation signal Vg making the mixing ratio of the motion-compensated interpolation signal SP1 high. Further, the motion-compensated interpolation signal generation circuit 16 deals with all the motion vectors V as the same motion vectors, and generates the motion-compensated interpolation signal SP1. This increases the mixing ratio of the motion-compensated interpolation signal SP1 in the moving image interpolation signal Vg, which facilitates mixing of the motion-compensated interpolation signal SP1 with the mixed interpolation signal Cg.

However, the accuracy of the motion vector V is not always high. Therefore, the moving image interpolation signal generation circuit 6 mixes the motion-compensated interpolation signal SP1 and the intrafield interpolation signal SP3. When vertical scrolling is detected, the moving image interpolation signal mixing circuit 18 changes the mixing ratio of the interpolation signal making the motion-compensated interpolation signal SP1 have priority over the intrafield interpolation signal SP3.

In this manner, the de-interlacing apparatus 2 can generate the more appropriate mixed interpolation signal Cg when the whole screen shifts in a predetermined direction, such as in the case when vertical scrolling is detected. Accordingly, the de-interlacing apparatus 2 can display a clear video image on the liquid crystal display panel 30.

The above explanation is for an embodiment of the present invention and is not to limit the apparatus and method according to the present invention, and various modifications can be easily made to the invention. Further, any apparatus or method configured by appropriately combining components, functions, characteristics or method steps in each embodiment is included in the present invention.

While certain embodiments of the inventions have been described, these embodiments have been presented by way of example only, and are not intended to limit the scope of the inventions. Indeed, the novel methods and systems described herein maybe embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A de-interlacing apparatus comprising:
   a motion vector detecting section that detects a motion vector of an input video signal;
   a full-screen shift detecting section that detects a full-screen shift indicating a shift of a whole screen in a predetermined direction from the motion vector detected by the motion vector detecting section;
   a moving-or-still judging section that performs a moving-or-still judgment according to an amount of motion of the input video signal based on a difference value between a current field signal of the input video signal and a two-field delay signal obtained by delaying the current field signal by two fields;
   a moving judgment correcting section that corrects, when a full-screen shift is detected by the full-screen shift detecting section, a judgment result obtained by the moving-or-still judging section to lean toward a moving judgment;
   a first interpolation signal generating section that performs motion compensation for a one-field delay signal, which is obtained by delaying the current field signal by one field, using detection results obtained by the motion vector detecting section and the full-screen shift detecting section, and generates a first interpolation signal for interpolating the one-field delay signal;
   a second interpolation signal generating section that generates a second interpolation signal for interpolating the one-field delay signal from any one of the current field signal and the two-field delay signal; and
   an interpolation signal mixing section that mixes the first interpolation signal and the second interpolation signal depending on the judgment result obtained by the moving-or-still judging section and corrected by the moving judgment correcting section to generate a mixed interpolation signal.

2. The de-interlacing apparatus according to claim 1, further comprising:

a third interpolation signal generating section that generates a third interpolation signal for interpolating the one-field delay signal by intrafield interpolation; and a moving image interpolation signal mixing section that mixes the first interpolation signal and the third interpolation signal to generate a moving image interpolation signal, wherein the interpolation signal mixing section mixes the second interpolation signal and the moving image interpolation signal instead of the first interpolation signal.

3. The de-interlacing apparatus according to claim 2, further comprising:

a reliability judging section that judges reliability of the motion vector; and a reliability correcting section that corrects, when a full-screen shift is detected by the full-screen shift detecting section, a judgment result obtained by the reliability judging section to increase the reliability, wherein the moving image interpolation signal mixing section mixes the first interpolation signal and the third interpolation signal depending on the judgment result obtained by the reliability judging section and corrected by the reliability correcting section.

4. The de-interlacing apparatus according to claim 1, further comprising:

a deinterlaced signal outputting section that outputs a deinterlaced signal using the one-field delay signal; and a display control section that displays a video image on a display section using the deinterlaced signal.

5. A de-interlacing method comprising:

detecting a motion vector of an input video signal;

detecting a full-screen shift indicating a shift of a whole screen in a predetermined direction from the motion vector detected;

performing a moving-or-still judgment according to an amount of motion of the input video signal based on a difference value between a current field signal of the input video signal and the two-field delay signal obtained by delaying the current field signal by two fields;

correcting, when a full-screen shift is detected, a judgment result obtained by the moving-or-still judgment to lean toward a moving judgment;

performing motion compensation for a one-field delay signal, which is obtained by delaying the current field signal by one field, using detection results obtained by the detecting a motion vector and the detecting a full-screen shift, and generating a first interpolation signal for interpolating the one-field delay signal;

generating a second interpolation signal for interpolating the one-field delay signal from any one of the current field signal and the two-field delay signal; and generating a mixed interpolation signal by mixing the first interpolation signal and the second interpolation signal depending on the judgment result obtained by the moving-or-still judgment and corrected by the correcting.

6. A video display apparatus comprising:

a de-interlacing section that outputs a deinterlaced signal; and a video display section that displays a video image using the deinterlaced signal output from the de-interlacing section, wherein the de-interlacing section includes a motion vector detecting section that detects a motion vector of an input video signal;

a full-screen shift detecting section that detects a full-screen shift indicating a shift of a whole screen in a predetermined direction from the motion vector detected by the motion vector detecting section;

a moving-or-still judging section that performs a moving-or-still judgment according to an amount of motion of the input video signal based on a difference value between a current field signal of the input video signal and a two-field delay signal obtained by delaying the current field signal by two fields;

a moving judgment correcting section that corrects, when a full-screen shift is detected by the full-screen shift detecting section, a judgment result obtained by the moving-or-still judging section to lean toward a moving judgment;

a first interpolation signal generating section that performs motion compensation for a one-field delay signal, which is obtained by delaying the current field signal by one field, using detection results obtained by the motion vector detecting section and the full-screen shift detecting section, and generates a first interpolation signal for interpolating the one-field delay signal;

a second interpolation signal generating section that generates a second interpolation signal for interpolating the one-field delay signal from any one of the current field signal and the two-field delay signal; and an interpolation signal mixing section that mixes the first interpolation signal and the second interpolation signal depending on the judgment result obtained by the moving-or-still judging section and corrected by the moving judgment correcting section to generate a mixed interpolation signal.

7. The video display apparatus according to claim 6, wherein the de-interlacing section further includes a third interpolation signal generating section that generates a third interpolation signal for interpolating the one-field delay signal by intrafield interpolation; and a moving image interpolation signal mixing section that mixes the first interpolation signal and the third interpolation signal to generate a moving image interpolation signal, and the interpolation signal mixing section mixes the second interpolation signal and the moving image interpolation signal instead of the first interpolation signal.

8. The video display apparatus according to claim 7, wherein the de-interlacing section further includes a reliability judging section that judges reliability of the motion vector; and a reliability correcting section that corrects, when a full-screen shift is detected by the full-screen shift detecting section, a judgment result obtained by the reliability judging section to increase the reliability, and the moving image interpolation signal mixing section mixes the first interpolation signal and the third interpolation signal depending on the judgment result obtained by the reliability judging section and corrected by the reliability correcting section.

9. The video display apparatus according to claim 6, further comprising:

a deinterlaced signal outputting section that outputs a deinterlaced signal using the mixed interpolation signal and the one-field delay signal.

* * * * *